US007283844B2

(12) United States Patent
Thompson

(10) Patent No.: US 7,283,844 B2
(45) Date of Patent: Oct. 16, 2007

(54) MULTI-BEAM ANTENNA WIRELESS NETWORK SYSTEM

(76) Inventor: Scott D. Thompson, 965 Grace St., State College, PA (US) 16801

( * ) Notice: Subject to any disclaimer, the term of this patent is extended or adjusted under 35 U.S.C. 154(b) by 715 days.

(21) Appl. No.: 09/825,636

(22) Filed: Apr. 4, 2001

(65) Prior Publication Data

US 2001/0036843 A1 Nov. 1, 2001

Related U.S. Application Data

(60) Provisional application No. 60/194,467, filed on Apr. 4, 2000.

(51) Int. Cl.
*H04B 1/38* (2006.01)

(52) U.S. Cl. .................. 455/562.1; 455/561; 455/428; 455/83

(58) Field of Classification Search ............ 455/562.1, 455/561, 422.1, 13.3, 129, 522, 428, 83, 455/424, 448; 370/335, 342, 328, 349, 356, 370/313, 203, 407, 447; 342/377, 373, 368
See application file for complete search history.

(56) References Cited

U.S. PATENT DOCUMENTS 5,745,884 A * 4/1998 Carnegie et al. .............. 705/34
5,812,947 A * 9/1998 Dent .......................... 455/427
5,894,598 A * 4/1999 Shoki ...................... 455/562.1
5,953,639 A * 9/1999 Weiss et al. ............... 340/7.24
5,960,074 A * 9/1999 Clark ......................... 379/310
5,974,317 A * 10/1999 Djuknic et al. ............. 455/431
6,151,513 A * 11/2000 Petry et al. .............. 455/562.1
6,301,238 B1 * 10/2001 Hagerman et al. .......... 370/336
6,313,783 B1 * 11/2001 Kuntman et al. ............. 342/32
6,320,540 B1 * 11/2001 Meredith .................... 342/377
6,349,217 B1 * 2/2002 Honcharenko et al. .. 455/562.1
6,359,873 B1 * 3/2002 Kobayashi .................. 370/338
6,381,473 B1 * 4/2002 Niki ........................ 455/562.1
6,453,176 B1 * 9/2002 Lopes et al. ............. 455/562.1
6,463,303 B1 * 10/2002 Zhao ....................... 455/562.1
6,473,616 B1 * 10/2002 Sydor ......................... 455/446

(Continued)

*Primary Examiner*—George Eng
*Assistant Examiner*—Brandon J. Miller
(74) *Attorney, Agent, or Firm*—John J. Elnitski, Jr.

(57) ABSTRACT

A wireless network system that utilizes a multi-beam antenna to communicate with multiple remote stations. The system includes a hub and one or more remote stations. The hub is connected to a source which requires communication with the remote stations, in order to exchange information, such as data and/or voice transmissions. The hub includes a multi-beam antenna assembly, one or more hub radio transceivers, an Ethernet switch, and a controller. Each remote station includes a single directive antenna, a single remote station radio transceiver, an Ethernet switch, and a controller. The multi-beam antenna assembly includes a beam former and a multi-beam antenna. The multi-beam antenna at the hub provides the ability to communicate with more than one remote station at a time. Communication between the hub and remote stations is via a line of sight radio path using directive antenna beams associated with the multi-beam antenna and the remote station antenna. The hub is able to serve and communicate with a multiplicity of fixed, line of sight remote stations using multiple hub radio transceivers co-located at the hub. Each remote station only communicates with the hub. The hub also includes received signal strength monitoring equipment with power control and can include more than one multi-beam antenna at the hub.

39 Claims, 11 Drawing Sheets

HUB

U.S. PATENT DOCUMENTS 6,522,643 B1 * 2/2003 Jacomb-Hood et al. ..... 370/347
6,615,024 B1 * 9/2003 Boros et al. ............. 455/67.14
6,628,627 B1 * 9/2003 Zendle et al. ............... 370/310
6,901,061 B1 * 5/2005 Joo et al. .................... 370/335
2002/0068612 A1 * 6/2002 Carey et al. ................ 455/562
2004/0110469 A1 * 6/2004 Judd et al. .................... 455/15

* cited by examiner

REMOTE STATION

MULTI-BEAM ANTENNA WIRELESS NETWORK SYSTEM

This application claims the benefit of and incorporates by reference U.S. Provisional Application No.: 60/194,467 filed Apr. 4, 2000.

BACKGROUND

Presently fixed broadband wireless access is provided by individual point to point radio/antenna systems. At the transmission side, a single directive antenna is mounted to a building or tower and pointed in the direction of the reception side. The antenna is connected to a radio bridge, which transmits and receives data, and forwards data based on the address of the received data packet. Likewise, at the reception side, there is a single directive antenna pointed in the direction of the transmission side. The antenna is connected to a radio bridge, which receives data and forwards the data based on the address of the received packet data. This radio bridge also transmits to the other side. If there is more than one site to which transmission must be sent, then multiple antennas must be erected, and each is ported to an associated radio bridge. However, due to the potential for interference of one co-located transmitter with another, it is necessary to perform antenna sidelobe/backlobe/coupling and inter-modulation distortion analysis with each new antenna added to the site.

It is an object of the present invention to provide a wireless network system which can communicate with multiple remote stations at the same time using a single antenna.

SUMMARY OF THE INVENTION

A wireless network system that utilizes a multi-beam antenna to communicate with multiple remote stations. The system includes a hub and one or more remote stations. The hub is connected to a source that requires communication with the remote stations, in order to exchange information, such as data and/or voice transmissions. The hub includes a multi-beam antenna assembly, one or more hub radio transceivers, an Ethernet switch, and a controller. Each remote station includes a single directive antenna, a single remote station radio transceiver, an Ethernet switch, and a controller. The multi-beam antenna assembly includes a beam former and a multi-beam antenna. The multi-beam antenna at the hub provides the ability to communicate with more than one remote station at a time. Communication between the hub and remote stations is via a line of sight radio path using directive antenna beams associated with the multi-beam antenna and the remote station antenna. Communication between the hub and remote stations is via a line of sight radio path using directive antenna beams associated with the multi-beam antenna and the remote station antenna. The hub is able to serve and communicate with a multiplicity of fixed, line of sight remote stations using multiple hub radio transceivers co-located at the hub. Each remote station only communicates with the hub.

DETAILED DESCRIPTION

The present invention is a wireless network system, which utilizes a multi-beam antenna. The system includes a hub and one or more remote stations. The hub is connected to a source that requires communication with the remote stations, in order to exchange information, such as data and/or voice transmissions. The source is usually some type of wired network infrastructure. The hub includes a multi-beam antenna assembly, one or more hub radio transceivers, an Ethernet switch, and a controller. Each remote station includes a single directive antenna, a single remote station radio transceiver, an Ethernet switch, and a controller. The multi-beam antenna assembly includes a beam former and a multi-beam antenna. The multi-beam antenna at the hub provides the ability to communicate with more than one remote station at a time. Communication between the hub and remote stations is via a line of sight radio path using directive antenna beams associated with the multi-beam antenna and the remote station antenna. The hub is able to serve and communicate with a multiplicity of fixed, line of sight remote stations using multiple hub radio transceivers co-located at the hub. Each remote station only communicates with the hub. The hub also includes received signal strength monitoring equipment with power control and can include more than one multi-beam antenna at the hub.

Figure 1:
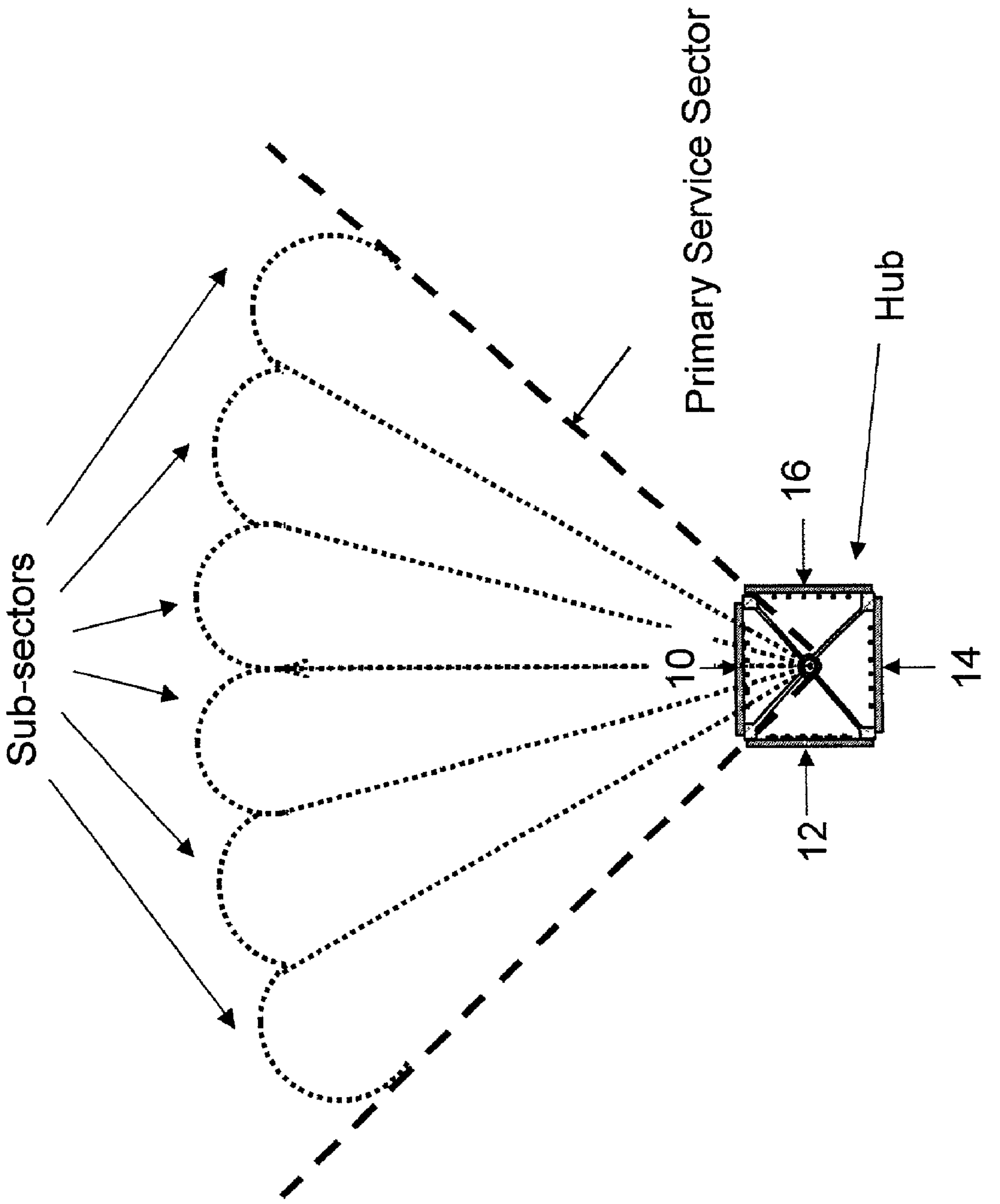
FIG. 1 is a schematic of a hub with more than one multi-beam antenna according to the present invention.
Figure 2:
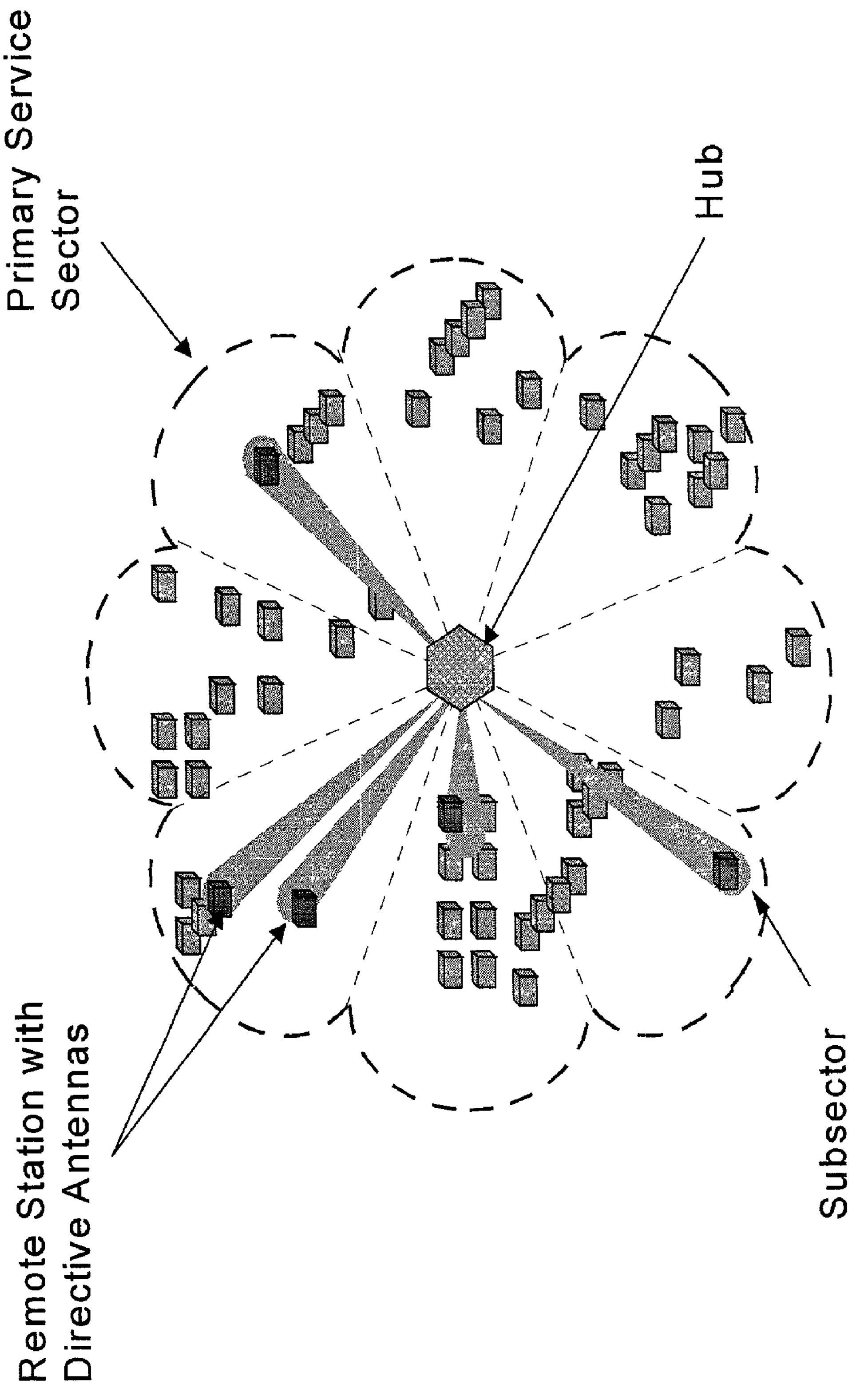
FIG. 2 is a schematic of a wireless network system according to the present invention.

FIG. 1 shows a schematic of the hub with four multi-beam antennas 10, 12, 14, 16. The use of four multi-beam antennas at the hub allows for coverage of a wide geographical region of interest. Each multi-beam antenna has a primary service sector. Within the primary service sector, the multi-beam antenna includes individual beam-formed sub-sectors. The individual beam formed sub-sectors are directive antenna beams or patterns generated by the multi-beam antenna. The directive antenna beams provide a degree of spatial isolation between sub-sectors. FIG. 2 schematically shows a field application of the hub. The hub is located in a geographically centralized location relative to a multitude of remote stations, which are to be served by the hub. The location of the hub must also provide access to the wired network infrastructure, if required. Six multi-beam antennas are shown in a hexagon configuration. The multi-beam antennas are arranged at the hub to optimize coverage of the remote stations. Each multi-beam antenna defines a primary service sector, within which are multiple beams or sub-sectors that can be activated. Arrangement of multi-beam antennas is flexible and needs only to cover those geographical segments wherein remote stations are positioned.

The advantages of the wireless network system are as follows. The multi-beam antenna generates multiple directive antenna patterns using an aperture size that is approximately the same as a single directive antenna. Once, a primary service sector has been established by the multi-beam antenna, new remote stations may be added by activating a beam formed sub-sector, rather than erecting an entirely new antenna. The directive beams of the sub-sector are partially isolated, which reduces co- and cross-channel interference, and improves frequency re-use. Power in each beam formed sub-sector may be individually adapted to the link requirement with a remote station, allowing minimization of required transmitted power. Optimization of transmitted power aids in reducing self-interference, interference to other communication channels, and lowers probability of intercept. The directive beams of the beam formed sub-sector may be activated only as required, and in directive patterns only. Again, this reduces self-interference, interference to other communication channels, and lowers probability of intercept. This also mitigates jamming and interference from other sources. The directive patterns provide additional link gain, which increase link range, and/or throughput, and/or fade margin. Multi-beam antennas may be engaged only as required, permitting system scalability. Each of the hub radio transceivers can be ported to a full duplex Ethernet switch port, providing dedicated, full duplex throughput at whatever data rate the radio transceiver and Ethernet switch will support. The system is applicable to any frequency range. The bandwidth is only restricted by bandwidth of the components contained in the system. The concept is applicable to a multiplicity of network implementations, including wireless T1, wireless Ethernet, wireless ATM etc. Finally, the multi-beam antenna may also be used as a passive or active reflector. Beams are activated and connected in the direction of arrival and transmission, eliminating the need for two or more antennas for passive or active reflector systems.

Figure 3:
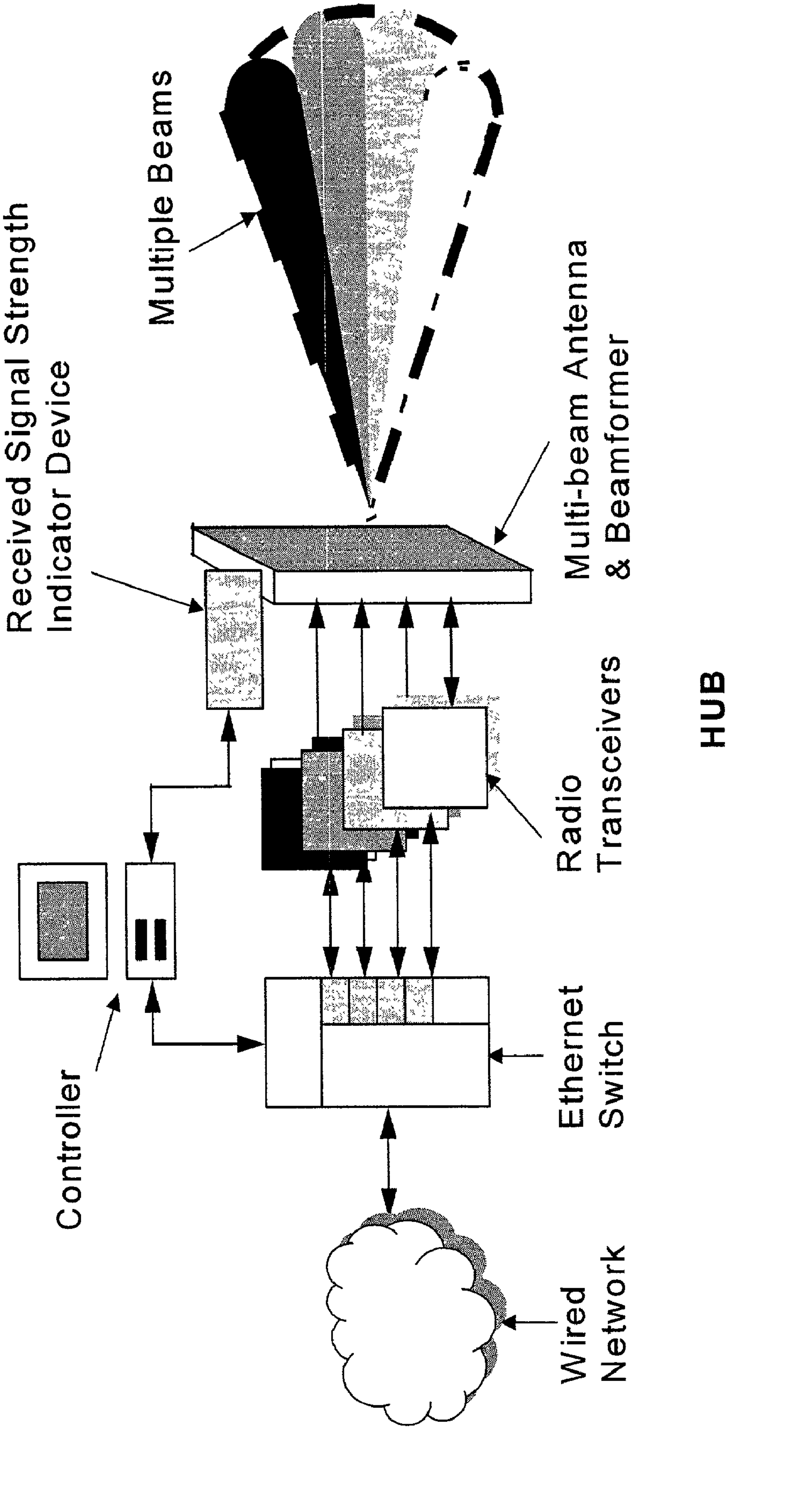
FIG. 3 is a schematic of a hub according to the present invention.

FIG. 3 shows a schematic of the operational components of the hub. The hub usually interfaces with some type of wired network. Within the hub is an Ethernet switch, which interfaces the hub radio transceivers with the wired network. There are switch ports on the Ethernet switch for each individual hub radio transceiver. On the wired network side of the hub, the Ethernet switch may port to multiple network architectures. The Ethernet switch may be either layer 2, which bridges traffic between switch ports, or layer 3, which assigns subnets to some or all of the switch ports, and route data packets appropriately. The hub radio transceivers provide the interface from the Ethernet to the multi-beam antenna assembly. The hub radio transceivers are connected to the beam-former of the multi-beam antenna assembly. The multi-beam antenna assembly generates directive beams in space, which are able to partially isolate the transmissions and receptions of each of the hub radio transceivers from one another. The multi-beam antenna and beam former utilize a received signal strength indicator device which allows the hub to monitor received signal strength and adapt power of the beams. A controller may be used to coordinate operation of the Ethernet switch and/or hub radio transceivers. The controller and received signal strength indicator device are usually some type of computer hardware. The controller may be used for frequency coordination, power control, or data packet transmission.

Figure 4:
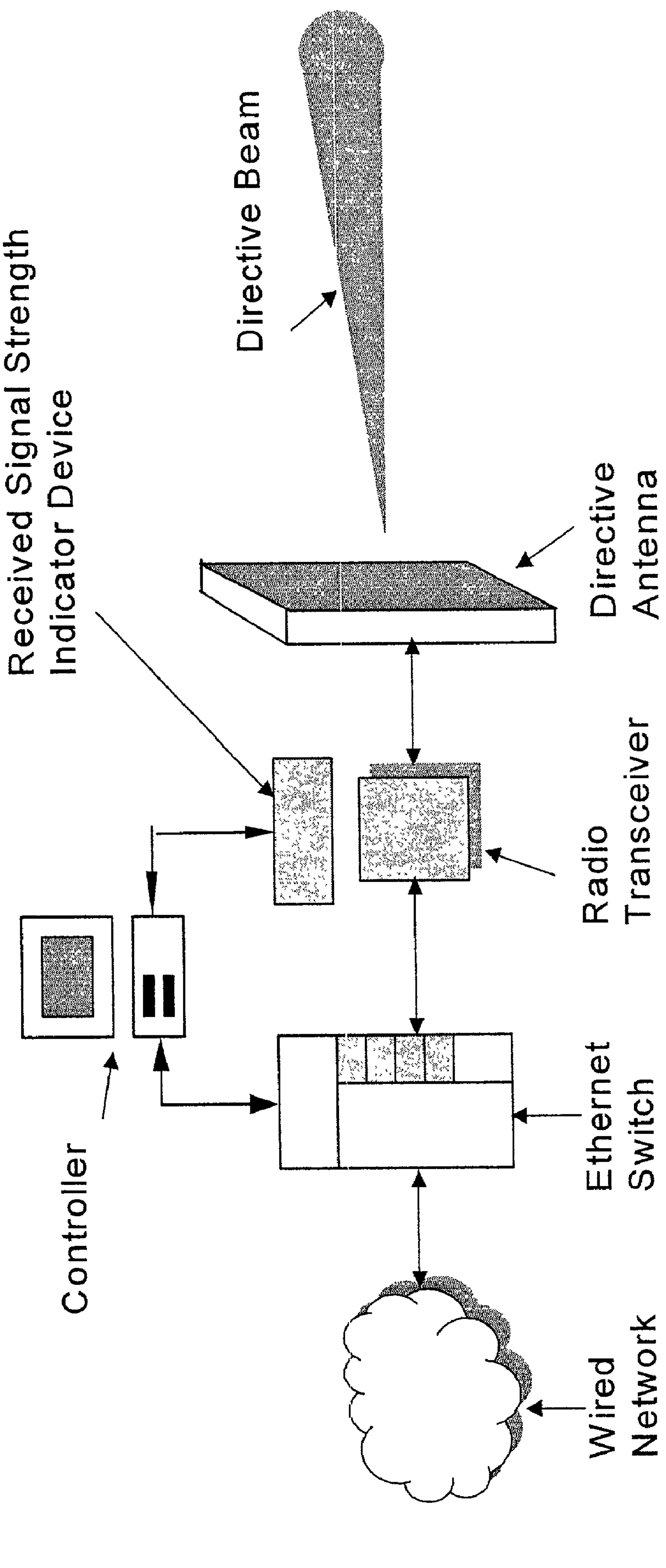
FIG. 4 is a schematic of a remote station according to the present invention.

FIG. 4 shows the main components of the remote station. The remote station includes a remote station radio transceiver that is synchronized to communicate in the same frequency band with the associated hub radio transceiver. The remote station radio transceiver interfaces with a local network, which can be either through an Ethernet switch, or directly into a wired network. In FIG. 4 the remote station radio transceiver is depicted as a stand alone unit, however, the remote station radio transceiver may also be a card within a PC. The remote station radio transceiver transmits and receives through a directive antenna, which is pointed toward the hub. A fixed directive beam generated by the remote station antenna is directed towards the hub in order to minimize interference with other remote stations. The remote station antenna and/or remote station radio transceiver can include a received signal strength indicator device and controller, similar to the received signal strength indicator device and controller in the hub. The wired network interfaced with the remote station may be connected to a multiplicity of remote network side architectures.

Figure 5:
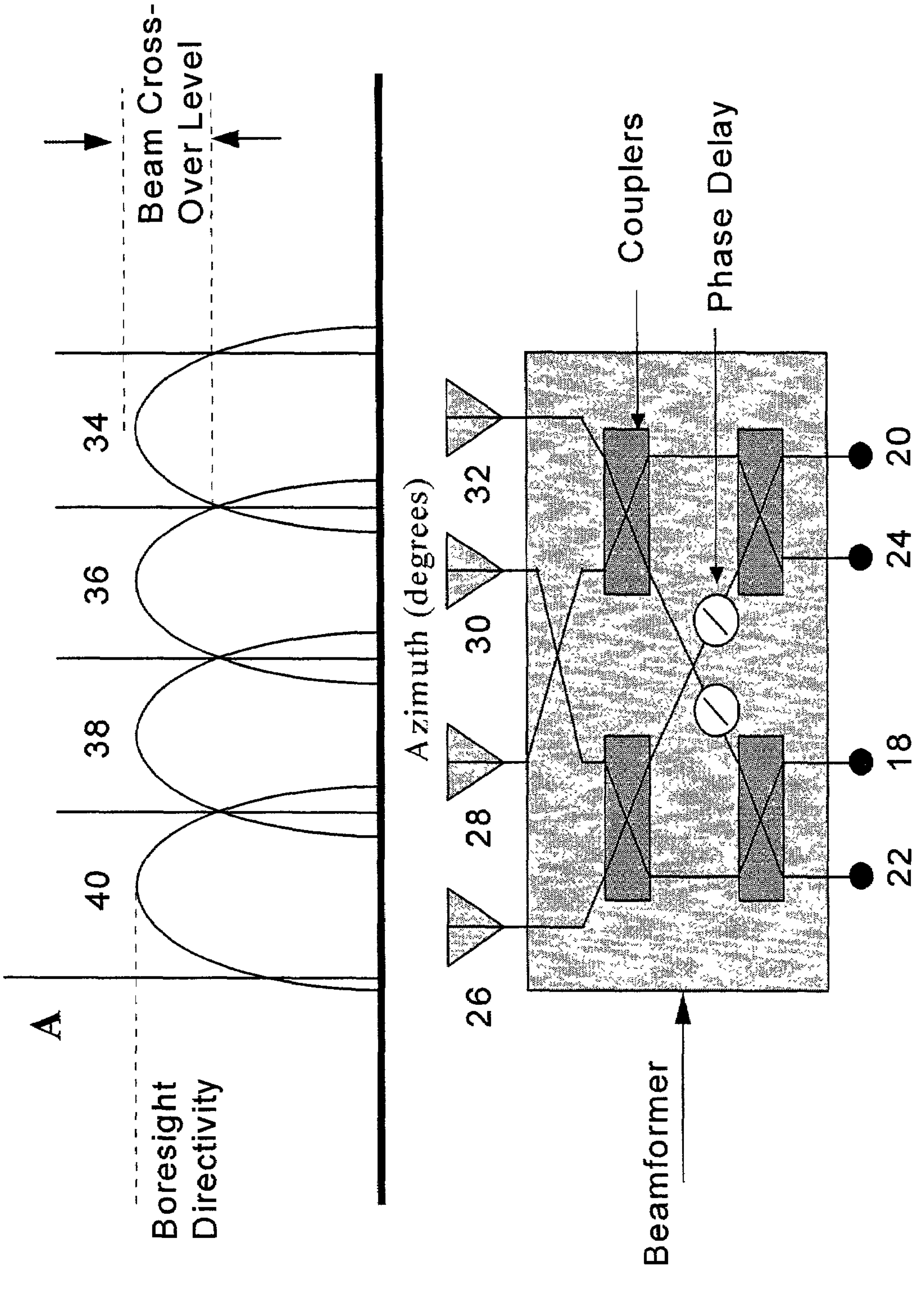
FIG. 5 is a schematic of a beam former according to the present invention.
Figure 6:
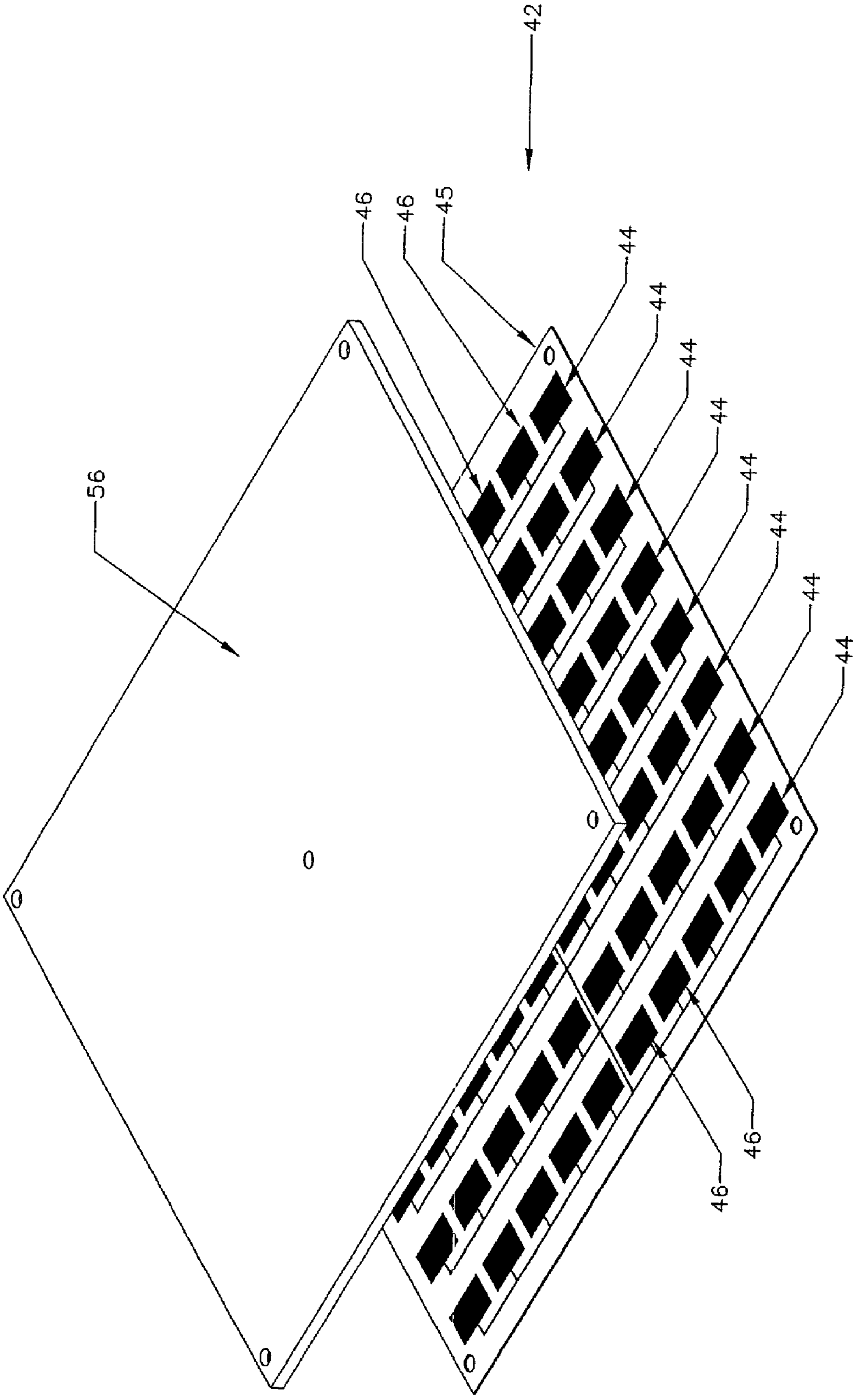
FIG. 6 is a perspective exploded view of a multi-beam antenna according to the present invention.

As shown in FIG. 5, the multi-beam antenna at the hub generates N independent beams from N independent inputs, using a N×N hybrid coupling matrix beam former. FIG. 5 shows a schematic of a N×N hybrid coupling matrix beam former with N input ports 18, 20, 22, 24 and N radiating elements 26, 28, 30, 32. FIG. 5 shows the N mainlobes 34, 36, 38, 40 generated by the radiating elements. Each mainlobe antenna beam is associated with an individual input port. As shown in FIG. 5, input port 18 is associated with mainlobe 36, input port 20 is associated with mainlobe 40, input port 22 is associated with mainlobe 34, input port 24 is associated with mainlobe 38. FIG. 5 shows a N=4 hybrid coupling matrix. N may be any radix 2 number and the hybrid coupling matrix provides one to one correspondence of input ports to mainlobe antenna beams. Each antenna beam is then able to serve one or more remote stations within the beam pattern. Each beam of the multiple beam antenna is associated with a single radio transceiver. Isolation between antenna beams provides for spatial filtering and increases system capacity. FIG. 5 is also an analog realization of the multi-beam antenna, wherein the beam former can include fixed microwave frequency phase delays, microwave frequency couplers, and microwave radiators. The phase delays and couplers are realized as stripline or microstrip etched patterns on circuit boards. The fixed microwave frequency phase delays, microwave frequency couplers, and microwave radiators shown can be substituted by a digital equivalent. FIG. 6 shows the multi-beam antenna 42 with eight radiating elements 44 on a circuit board 45, whereby each row of patches shown is a radiating element. The radiating elements 44 may be realized as microstrip patch radiators, dipoles or any type of linear or circularly polarized radiator. The radiating elements 46 may be coupled to the beam former either through direct metallic contacts or with slot or aperture couplers. In space, radiations from the individual radiators combine to form the individual beam patterns 34, 36, 38, 40 shown in FIG. 5. The beam patterns 34, 36, 38, 40 formed by the radiators have directivity at a certain azimuthal position. The beam patterns 34, 36, 38, 40 overlap at a point in the beam pattern 34, 36, 38, 40 called the beam crossover level. The beam crossover level can be adjusted to provide the desired azimuthal coverage, while trading off isolation beam patterns 34, 36, 38, 40. The number of beams per sector, the beamwidth of each beam, the width of the sectors and the number of sectors to cover 360 degrees can be optimized a desired application using this system.

Figure 7:
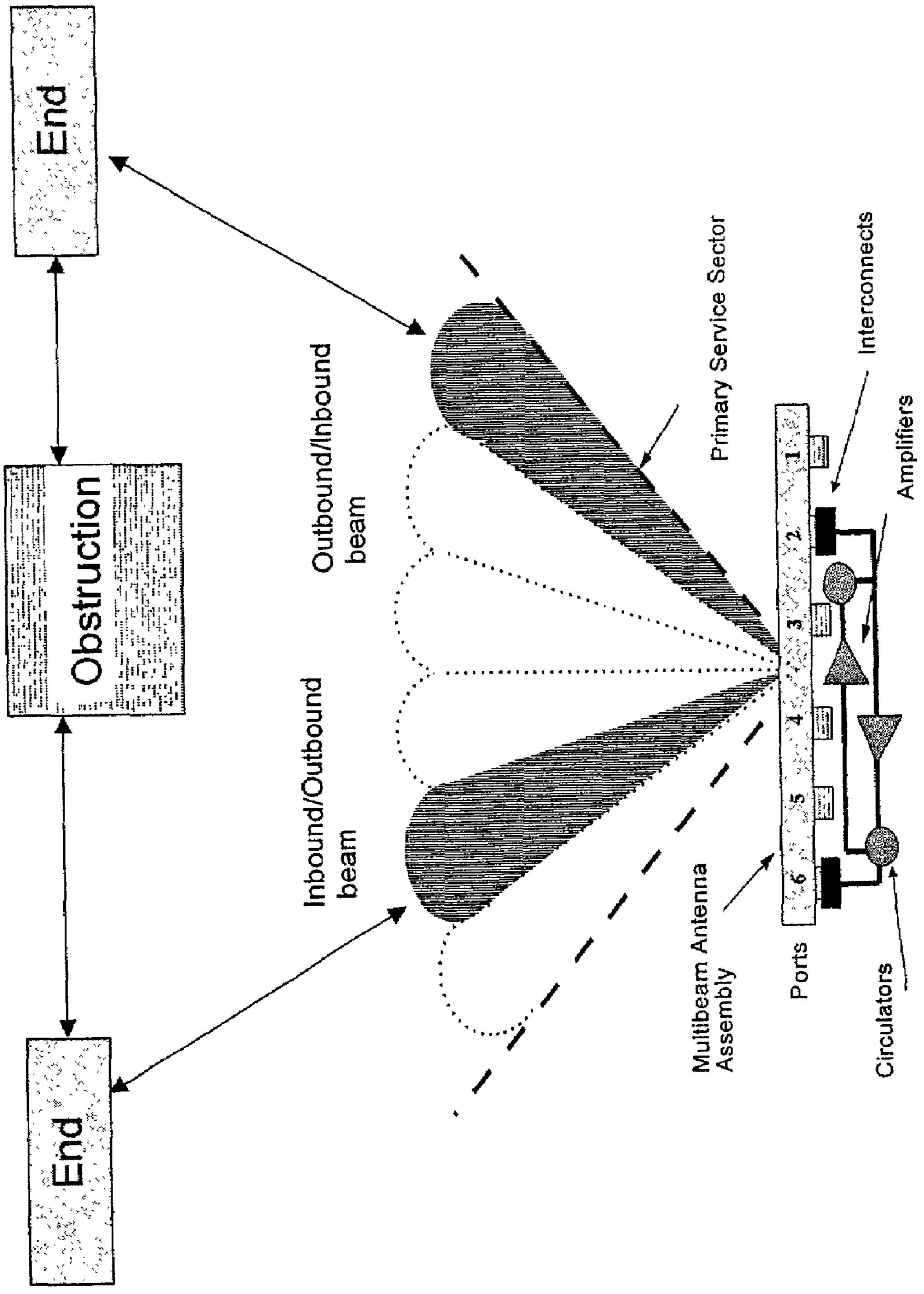
FIG. 7 is a schematic of a multi-beam antenna as a reflector according to the present invention.

The multi-beam antenna assembly may also be used as a reflector, as shown in FIG. 7. The multi-beam antenna as a reflector finds applications where the normal line-of-sight radio path is blocked by an obstruction. The multi-beam antenna is positioned at an angle such that it is visible from both ends of an obstructed radio path. The primary service sector shall transect an angle which includes a line-of-sight path to each of the ends of the radio path. The two beams of the multi-beam antenna which are directed most closely in the direction of the ends of the radio path are selected and connected together. In this example, the inbound/outbound radio path in the second beam from the left is associated with port 2. The outbound/inbound radio path in the beam on the right hand side of the drawing is associated with port 6. Port 2 and port 6 are connected together with coaxial interconnects. Circulators split the duplex signals into the respective channels for amplification in the amplifiers for active repeating. For passive repeating, the ports 2 and 6 are simply connected with a coaxial interconnect. This connecting of beams internally in the multi-beam antenna may also be realized digitally. The integration of the multi-beam antenna in the role of a reflector with the beam former and the hub would allow one of the ends to act as a source, whereby on the other side of the obstruction there could be a series of remote stations which need to communicate with that source. The use of the multi-beam antenna as a reflector provides a simpler, smaller, and more versatile system than using two or more antennas, which must be mounted and positioned individually to point towards their respective ends of the radio path. The multi-beam antenna assembly may be mounted flush on the side of a building for unobtrusive system versatility, due to its flat panel design. Using the flush mounted multi-beam antenna assembly also reduces wind loading and mounting costs.

Figure 8:
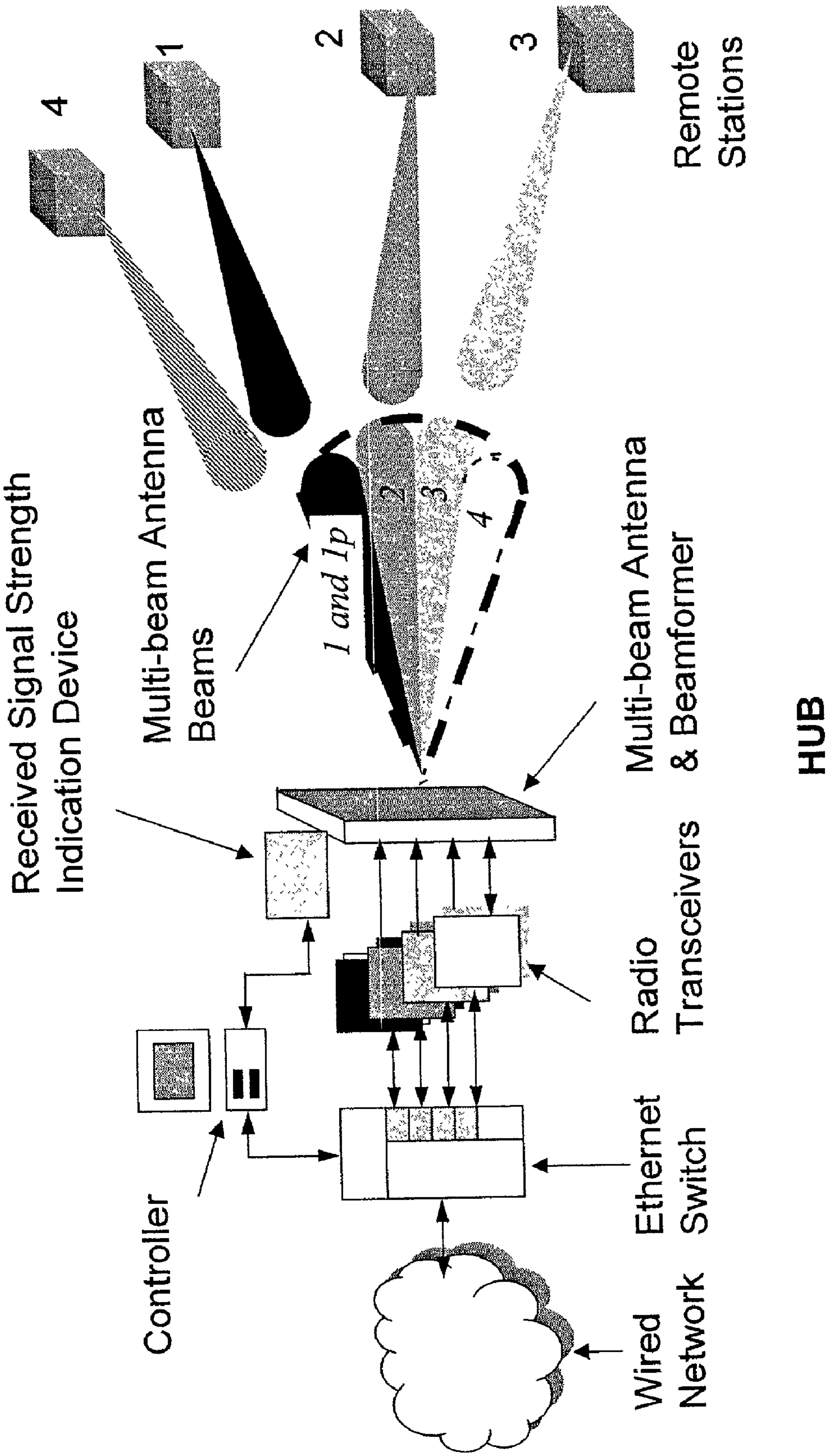
FIG. 8 is another schematic of a wireless network system according to the present invention.

FIG. 8 shows schematically the use of the system in providing multiple access to different remote stations. To provide proper isolation between radio frequency signals from different remote stations, radio frequency use must be considered, as would be practical to use the least number of designated radio frequencies as it possible. One of the initial concerns is for adjacent beams. FIG. 8 shows adjacent beams, such as beams 1 and 2, whereby two remote stations associated with beams 1 and 2 attempt to communicate with the hub. The remote stations must be angularly separated such that remote station number 1 resides within the 3 dB beamwidth of beam 1 and remote station 2 resides within the 3 dB beamwidth of beam 2. The radio transceivers are tuned in frequency such that remote station 1 transmits and receives at the same frequencies at which beam 1 receives and transmits, respectively. Likewise remote station 2 transmits and receives at the same frequencies at which beam 2 receives and transmits, respectively. However, the transmit and receive frequency set of remote station 1 must be different from the transmit and receive frequency set used by station 2, thus permitting multiple access between adjacent beams.

For non-adjacent beams angular diversity between non-adjacent beams can be utilized to allow use of the same frequency, as shown in FIG. 8 for remote stations 1 and 3. Remote station 3 is shown angularly separated from remote station 1 by more than one beam width. This separation allows remote station 3 to communicate with the beam 3 at the same time as remote station 1 communicates with beam 1, even though the remote stations 1 and 3 are using the same frequency. This is possible because the beams intended to be linked are formed angularly toward each other by the directive antenna at the remote station and the multi-beam antenna at the hub, thereby isolating or constraining transmissions to the respective intended beams. Thus, beam 1 does not substantially detect transmissions from remote station 3, nor does beam 3 substantially detect transmissions from remote station 1. Likewise, remote station 1 does not substantially detect transmissions from beam 3, nor does remote station 3 substantially detect transmissions from beam 1.

Using angular diversity as described is effective but is not the complete solution when using a multi-beam antenna. The presence of sidelobes, i.e. energy transmission from an antenna in directions away from the mainlobe of the beam can cause some interference. This is because some energy from beam 1 is detected by remote station 3, some energy from beam 3 is detected by remote station 1, and so on. Signal strength control using the received signal strength device aids angular diversity in allowing multiple remote stations communicate through the multi-beam antenna on the same frequency. Because the sidelobes have lower gain than the mainlobe, these transmissions can be rejected on the basis of their lower received signal strength. The radio transceivers at each remote station and at the hub have a received signal strength measurement and indication capability in the received signal strength device. For normal communications, the transmit power of each radio transceiver is set to obtain a nominal received signal strength at the other radio transceiver with which it communicates. For example, the transmit power out of the radio transceiver at remote station 1 is set to achieve a nominal receive power at the radio transceiver at the hub, and vice versa. Transmissions through the sidelobe from station 3 will be received at substantially lower power at the radio transceiver associated with beam 1, because the gain through the sidelobe is lower than through the main lobe. Thus, by using a threshold value wherein only radio signals of a certain nominal signal strength are processed, and signals below this threshold are squelched, it is possible to reject undesired transmission through or from the sidelobe.

In the event that a second remote station resides within the same sub-sector and uses the same frequency, polarization diversity can be employed. For example in FIG. 8, remote station 4 resides in the same beam as remote station 1 and assuming the frequency channelization is identical for remote station 1 and 4, the polarization of the antenna for the second station 4 can be changed. For this example, remote station 1 communicates with beam 1 using horizontally polarized antennas. A second remote station 4 desires to communicate with the hub. Remote station 4 can use a vertically polarized antenna, whereby vertically polarized overlay beam, beam 1*p*, is generated at the hub to communicate with the remote station 4. Since the transmissions are orthogonally polarized they are isolated and independent.

Figure 9:
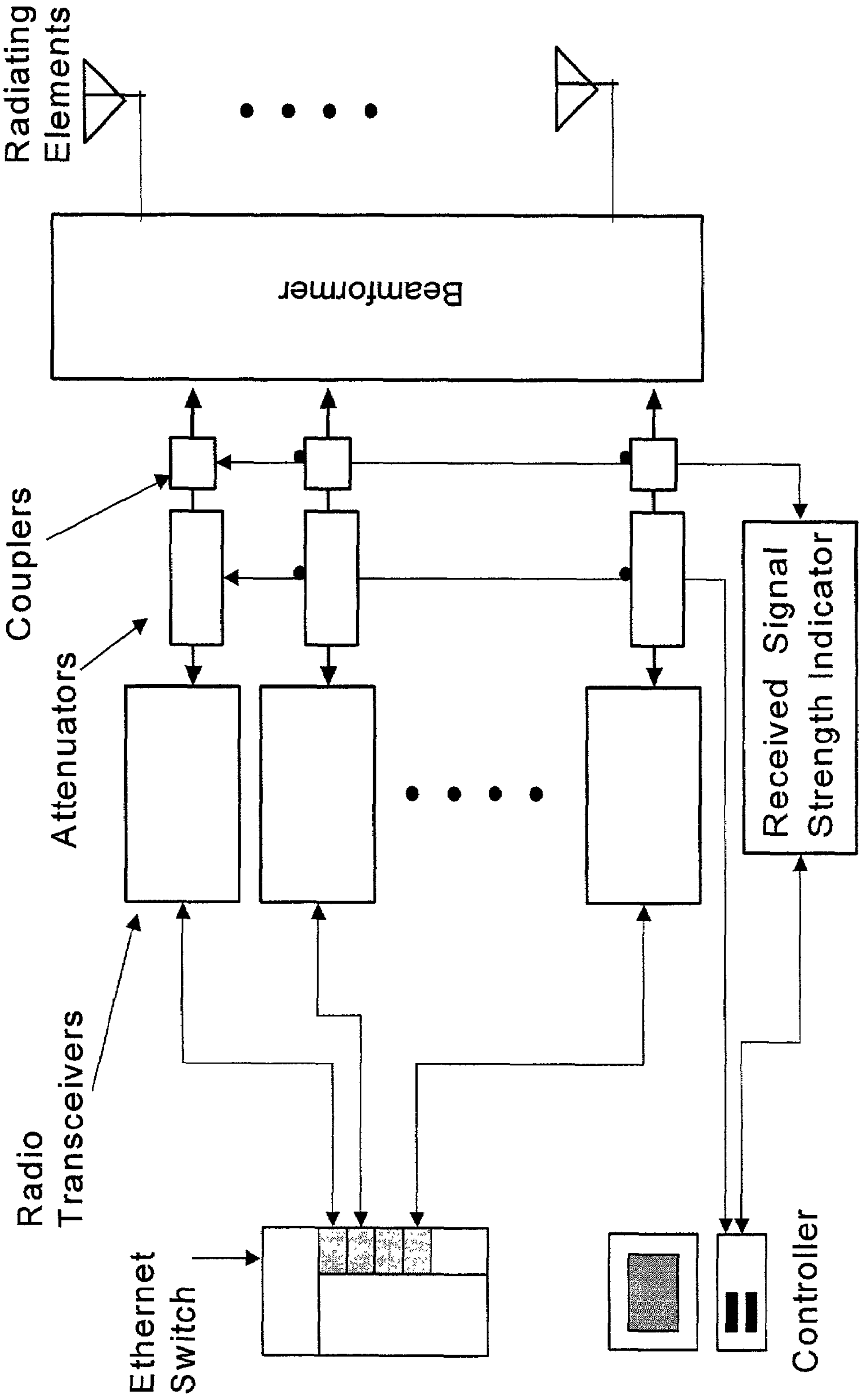
FIG. 9 is a schematic of power control features in the wireless network system according to the present invention.

FIG. 9 shows additional detail on the capability of the received signal strength indicator device and controller at the hub. This capability may be provided internally by the hub radio transceiver or may be external of the hub radio transceiver as shown. Power is sampled to the received signal strength indicator device from directional couplers in the radio frequency transmission path. The received signal strength indicator device is able to measure power received at the hub radio transceiver. The received signal strength is reported to the controller. The controller either calculates, or through a look-up table ascertains, the required transmission power based on the received signal strength. The transmission power is then adjusted by means of voltage variable attenuators, which can adjust the power to each of the individual input ports of the beam former. The capability of the received signal strength indicator device and controller is required in both the hub and remote stations. This capability allows for minimizing transmission power, mitigating interference to other channels, and reducing the probability of undesired or clandestine intercept. The hub radio transceivers operate as a slave and the remote station radio transceivers each operate as masters. The master supplies its timing reference to the slave during normal operation. At initial setup the master radio transceiver transmits a link specific beacon at minimum power. The master also listens for the slave to begin transmitting. The slave remains in receive mode until the beacon from the master is received and recognized at an adequate power for proper operation. The power of the master is incremented, or the antenna is aligned, until the slave receives adequate power and responds with a power alignment signal back to the master. At this point, a link is established and the power the master transmits is known. The master transmits the power requirement to the slave, and the slave is set to the same power as the master. This assures minimum transmit power from each end of the link, which is required to mitigate interference between beams, and improve overall system capacity. If transmitter power or antenna alignment cannot be adapted to provide the desired received signal level, a modulation format may be adapted. Initially, modulation will provide for the highest possible data rate, however, if inadequate power is received at the slave, the data rate shall be reduced until adequate power is received for a given data rate. The master shall initially adapt its modulation, and then communicate the new requirement for modulation format to the slave. In each case, if the master does not receive an adequate response signal from the slave, the master adapts its modulation format, then communicates the new modulation format requirement to the slave.

Figure 10:
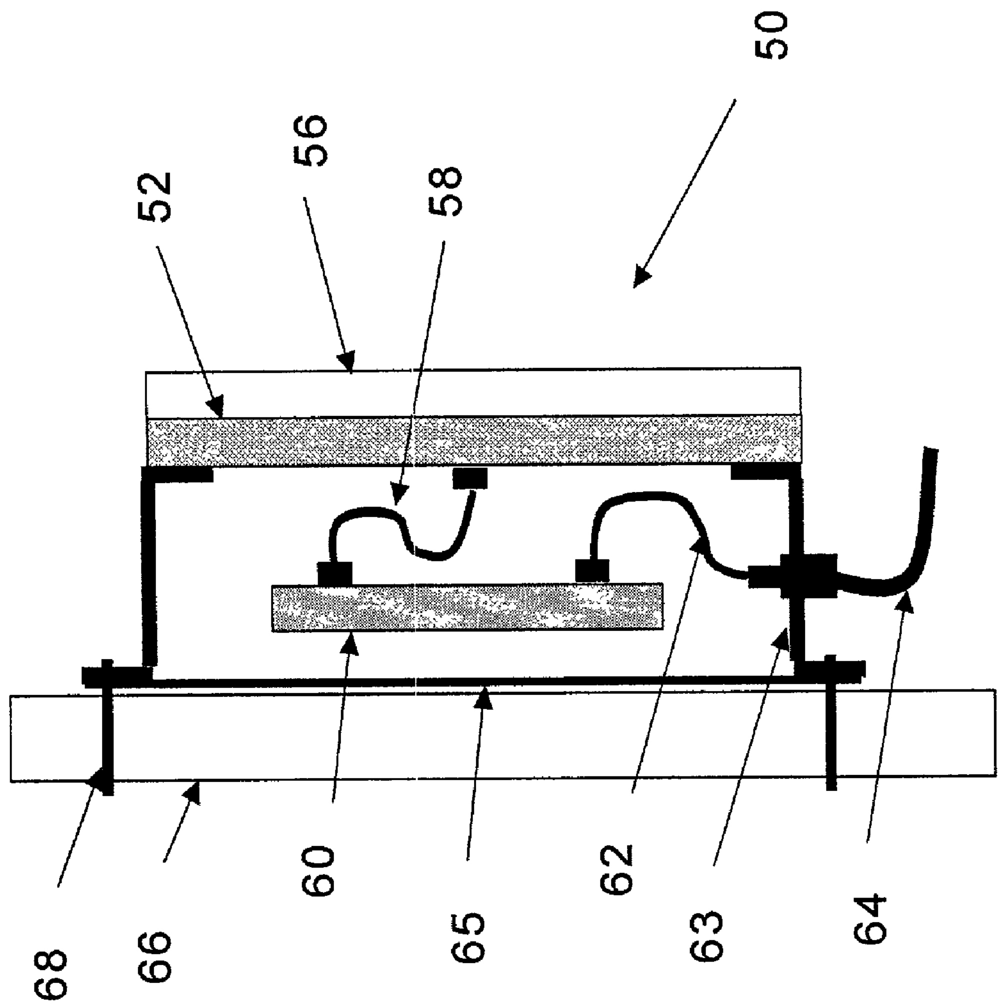
FIG. 10 is a schematic of a multi-beam antenna assembly according to the present invention.

The analog implementation of the beam former as part of the multi-beam antenna assembly is shown in FIG. 10. A multilayer microstrip and stripline assembly may be employed as the assembly method for the multi-beam antenna assembly 50. A microstrip antenna pattern is realized on an antenna substrate 52 as shown in FIG. 6. The antenna substrate is covered by a second substrate layer 56, which acts as a radome to protect the antenna. The microstrip antenna is fed from the backside through a transfer cable 58 that interfaces with the stripline beam former 60. The stripline beam former 60 is fed from internal antenna cables 62 that act as stress relief. The internal antenna cables 62 are mounted to an S shaped bar 63, which provides structural support for the multi-beam antenna assembly 50. The internal antenna cables 62 are connected to external antenna cables 64. The back of the multi-beam antenna assembly 50 is covered with a folded sheet metal cover 65 to form the multi-beam antenna assembly 50. The multi-beam antenna assembly 50 can then be mounted to a mast 66 using U-bolts 68 or to a face of a wall.

The transmit operation of the beam former 60 and multi-beam antenna 53 as the multi-beam antenna assembly 50 is as follows. Radio signals from the hub radio transceiver are fed into the multi-beam antenna assembly 50 via the external antenna cables 64. There may be a multiple of external antenna cables 64, each emanating from different hub radio transceivers. Each of the external antenna cables 64 is connected to an internal antenna cable 62, which feeds the stripline beam former 60. Within the stripline beam former 60, the signal from each of the internal antenna cables 62 is split and phase delayed according to the number of radiating elements used in the multi-beam antenna 52. For example, if there are six radiating elements in the multi-beam antenna 52, then the beam former 60 will have six outputs and signals from the internal antenna cables 62 are split six ways. However, the signals from the six internal antenna cables 62 are each phased differently within the beam former 60. The outputs of the beam former 60 are fed to the radiating elements of the multi-beam antenna 52 by the transfer cables 58. The radiating elements radiate the signal at a phase which provides for the combination of the signal in space in a particular azimuth direction. Since the phasing through the beam former 60 is different for each of the input signals, the azimuth direction for signal recombination is different for each of the input signals. Likewise, for reception, waveforms are received by the radiating elements of the multi-beam antenna 52. The received signal is passed through the transfer cables 58 to the output ports of the beam former 60. The beam former 60 combines the received signal from the radiating elements in such a way that signals received from a particular direction in azimuth are combined constructively at a certain input port on the beam former 60. The signal from the input port of the beam former 60 then feeds into the internal antenna cable 62 and onto the external antenna cable 64, which then passes the signal to the radio transceiver of the hub. For example, if there were six radiating elements, the six received signals would be passed to the six output ports of the beam former 60. The beam former 60 recombines the six signals such that the signals recombine constructively at one of the six input ports of the beam former 60. This is then passed to one of six radio transceivers of the hub via the internal and external antenna cables 62, 64.

Figure 11:
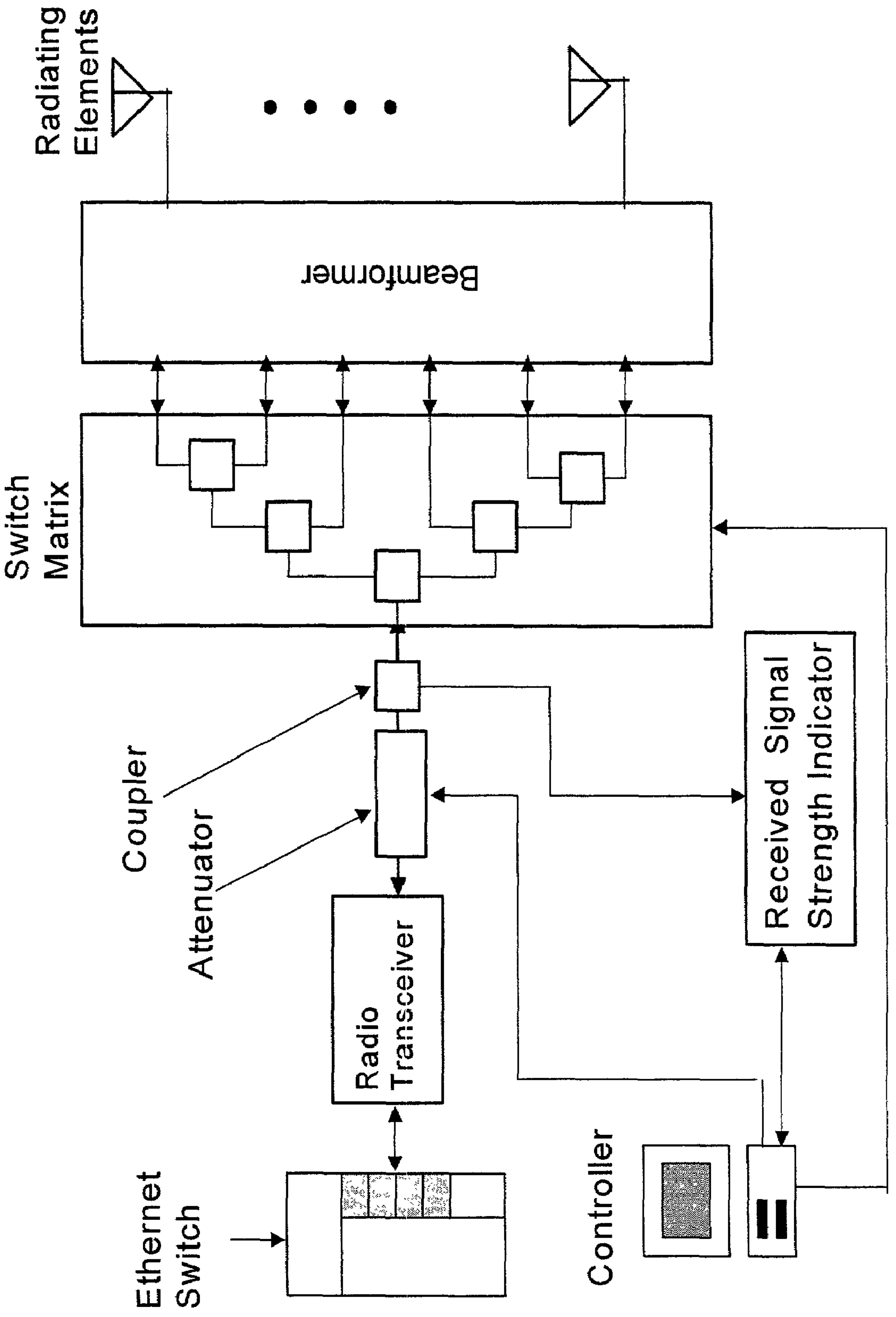
FIG. 11 is a schematic of a switch matrix in the hub according to the present invention.

FIG. 11 shows an implementation of the hub with a switch matrix. The switch matrix permits the use of a single radio transceiver for feeding to or receiving from the beam former and radiating elements. As an example, the switch matrix could be a multiplicity of single pole double throw switches. The controller engages the switches, such that a path from the switch matrix input on the hub radio transceiver side to the desired output on the beam former side is established. Thus, a multiplicity of radio transceivers and cables may be eliminated, and the system may be operated with a minimal amount of radio transceivers and connecting cables. The switch path to be selected may be programmed into the controller, or the controller may have the switch matrix cycle through each available path and select active paths by measuring the presence of a received signal in the received signal strength indicator device. The switch matrix may be incorporated as another layer in the multilayer microstrip and stripline assembly of the multi-beam antenna assembly.

I claim:

1. A wireless network system comprising:

a communication hub linked to a source;

at least one remote station which communicates with said communication hub in order to exchange information with the source, each of said at least one remote station including a directive antenna and a remote station address;

a multi-beam antenna connected to said communication hub to allow the exchange of information between said communication hub and each of said at least one remote station, said multi-beam antenna producing a plurality of beams for such exchange of information, wherein each beam of said plurality of beams is assigned to one of said at least one remote station; and an Ethernet switch within and part of said hub which is linked between the source and said multi-beam antenna to provide automated switching capability between said source and said each beam of said plurality of beams to allow automated selection of a beam of said plurality of beams by one of said at least one remote station addresses.

2. The wireless network system of claim 1, wherein there is a plurality of remote stations.

3. The wireless network system of claim 1, further including a beam former linked between said hub and said multi-beam antenna.

4. The wireless network system of claim 3, wherein said beam former includes the use of a N×N hybrid coupling matrix having N input ports and N radiating elements and wherein a value of N may be any radix 2 number.

5. The wireless network system of claim 3, wherein said beam former includes fixed microwave frequency phase delays, microwave frequency couplers, and microwave radiators.

6. The wireless network system of claim 3, wherein said beam former is in the form of stripline etched patterns on at least one circuit board.

7. The wireless network system of claim 3, wherein said beam former is in the form of microstrip etched patterns on at least one circuit board.

8. The wireless network system of claim 1, further including at least one radio transceiver as part of said hub which is linked between the source and said multi-beam antenna.

9. The wireless network system of claim 8, further including a switching matrix as part of said hub which is linked between one said at least one radio transceiver and said multi-beam antenna, said switching matrix allowing service of more than one of said at least one remote station by one radio transceiver.

10. The wireless network system of claim 8, further including a Ethernet switch as part of said hub which is linked between the source and said at least one radio transceiver.

11. The wireless network system of claim 1, further including a radio transceiver for each of said at least one remote station as part of said hub which is linked between the source and said multi-beam antenna.

12. The wireless network system of claim 11, further including a Ethernet switch as part of said hub which is linked between the source and each of said radio transceivers.

13. The wireless network system of claim 1, further including more than one multi-beam antenna and wherein each of said multi-beam antennas includes a primary service sector which forms an area of said plurality of beams of each of said multi-beam antennas.

14. The wireless network system of claim 1, further including a received signal strength indicator device at said hub to monitor received signal strength of said beams and adapt power of said beams produced by said multi-beam antenna.

15. The wireless network system of claim 1, further including a controller at said hub for frequency coordination, power control and data packet transmission.

16. The wireless network system of claim 1, further including a received signal strength indicator device at said at least one remote station to monitor received signal strength of said beams and adapt power of said beams produced by said multi-beam antenna.

17. The wireless network system of claim 1, further including a controller at said at least one remote station for frequency coordination, power control, and data packet transmission.

18. The wireless network system of claim 1, wherein said multi-beam antenna includes radiating elements on a circuit board.

19. The wireless network system of claim 18, wherein said multi-beam antenna is of a mirostrip construction.

20. The wireless network system of claim 1, wherein the source is linked to said hub by said multi-beam antenna.

21. The wireless network system of claim 20, further including at least one radio transceiver as part of said hub which is linked between a signal received by said multi-beam antenna from the source and a port of said multi-beam antenna in which the signal is directed to so that the signal may be transmitted to one of said at least one remote station.

22. The wireless network system of claim 21, further including a switching matrix as part of said hub which is linked between one said at least one radio transceiver which receives said signal from the source and said multi-beam antenna, said switching matrix allowing the service of more than one of said at least one remote station by one radio transceiver.

23. The wireless network system of claim 1, wherein adjacent beams of said plurality of beams are of a different frequency.

24. The wireless network system of claim 1, wherein each of said at least one remote station is within a 3 dB beam-width of one of said plurality of beams.

25. The wireless network system of claim 1, wherein at least two non-adjacent beams of said plurality of beams are of a same frequency.

26. The wireless network system of claim 25, wherein said at least two non-adjacent beams and said remote stations linked to said at least two non-adjacent beams include power adjustment such that sidelobes associated with communication of one of said non-adjacent beams is minimized so as to minimize interference with said other of said non-adjacent beams which are of the same frequency.

27. The wireless network system of claim 1, wherein each of at least two remote stations that utilize a same beam of said plurality of beams for communication have a different polarization of said directive antenna at each of said remote stations.

28. The wireless network system of claim 1, wherein said multi-beam antenna is a circuit board of radiating elements covered by a radome.

29. A wireless network system comprising:

a communication hub linked to a source;

at least one remote station which communicates with said communication hub in order to exchange information with the source, each of said at least one remote station including a directive antenna and a remote station address;

a multi-beam antenna connected to said communication hub to allow the exchange of information between said communication hub and each of said at least one remote station, said multi-beam antenna producing a plurality of beams for such exchange of information, wherein each beam of said plurality of beams is assigned to one of said at least one remote station;

a beam former linked between said hub and said multi-beam antenna; and an Ethernet switch within and part of said hub linked between the source and said beam former to provide automated switching capability between said source and said each beam of said plurality of beams to allow automated selection of a beam of said plurality of beams by one of said at least one remote station addresses.

30. The wireless network system of claim 29, further including at least one radio transceiver as part of said hub and linked between said Ethernet switch and said beam former.

31. The wireless network system of claim 30, wherein there is a plurality of remote stations.

32. The wireless network system of claim 31, further including more than one multi-beam antenna and wherein each of said multi-beam antennas includes a primary service sector in which are said plurality of beams of each of said multi-beam antennas.

33. The wireless network system of claim 29, wherein there is a plurality of remote stations.

34. The wireless network system of claim 29, further including more than one multi-beam antenna and wherein each of said multi-beam antennas includes a primary service sector in which are said plurality of beams of each of said multi-beam antennas.

35. A method of a source communicating with a plurality of remote stations using a wireless network system, the wireless network system including a communication hub linked to the source, said hub including a beam former; at least one remote station which communicates with said communication hub in order to exchange information with the source, each of said at least one remote station including a directive antenna and a remote station address; a multi-beam antenna connected to said communication hub to allow the exchange of information between said communication hub and each of said at least one remote station, said multi-beam antenna producing a plurality of beams for such exchange of information; comprising:

linking each of said at least one remote station to one of said plurality of beams;

coordinating sending and receiving of the information between the source and remote station by way of the plurality of beams using the hub; and further including an Ethernet switch within and part of said hub and linked between the source and said beam former to provide automated switching capability between said source and said each beam of said plurality of beams to allow automated selection of a beam of said plurality of beams by one of said at least one remote station addresses.

36. The method of claim 35, farther including a beam former linked between said hub and said multi-beam antenna.

37. The method of claim 36, further including more than one multi-beam antenna and wherein each of said multi-beam antennas includes a primary service sector in which are said plurality of beams of each of said multi-beam antennas.

38. The method of claim 35, further including at least one radio transceiver as part of said hub and linked between said Ethernet switch and said beam former.

39. The method of claim 38, further including more than one multi-beam antenna and wherein each of said multi-beam antennas includes a primary service sector in which are said plurality of beams of each of said multi-beam antennas.

* * * * *